United States Patent [19]
McCue

[11] 3,846,328
[45] Nov. 5, 1974

[54] METHOD FOR SEPARATING SULFIDE PHOSPHOR PARTICLES FROM MIXTURES

[75] Inventor: Bernard Beverly McCue, Christian Island, Ontario, Canada

[73] Assignee: RCA Corporation, New York, N.Y.

[22] Filed: July 20, 1973

[21] Appl. No.: 381,174

[52] U.S. Cl.................. 252/301.6 S, 252/301.4 S, 252/301.4 R, 423/21, 423/99
[51] Int. Cl....... C09k 1/12, C09k 1/14, C09k 1/44
[58] Field of Search............ 252/301.4 R, 301.4 S, 252/301.6 S; 423/21, 99

[56] References Cited
UNITED STATES PATENTS

| | | | |
|---|---|---|---|
| 3,348,924 | 10/1967 | Levine et al. | 252/301.4 R |
| 3,474,040 | 10/1969 | Hedler et al. | 252/301.4 R |
| 3,523,904 | 8/1970 | Single | 252/301.4 R X |
| 3,625,659 | 12/1971 | Hammond et al. | 252/301.4 R X |
| 3,740,342 | 6/1973 | Platt et al. | 252/301.6 S |

*Primary Examiner*—Jack Cooper
*Attorney, Agent, or Firm*—G. H. Bruestle; L. Greenspan

[57] ABSTRACT

To separate chemically-oxidizable sulfide phosphor particles, such as zinc sulfide and zinc-cadmium sulfide phosphor particles, from a mixture with essentially nonoxidizable phosphor particles, produce an aqueous slurry containing the mixture of particles, about 1 to 10 weight-percent mineral acid, and about 1 to 5 weight-percent alkali nitrite. The acid and nitrite react with the oxidizable phosphor particles producing gas bubbles, which cause the oxidizable particles to rise and to float on the surface of the slurry. The floated particles are removed by decantation, skimming, or other technique.

7 Claims, 2 Drawing Figures

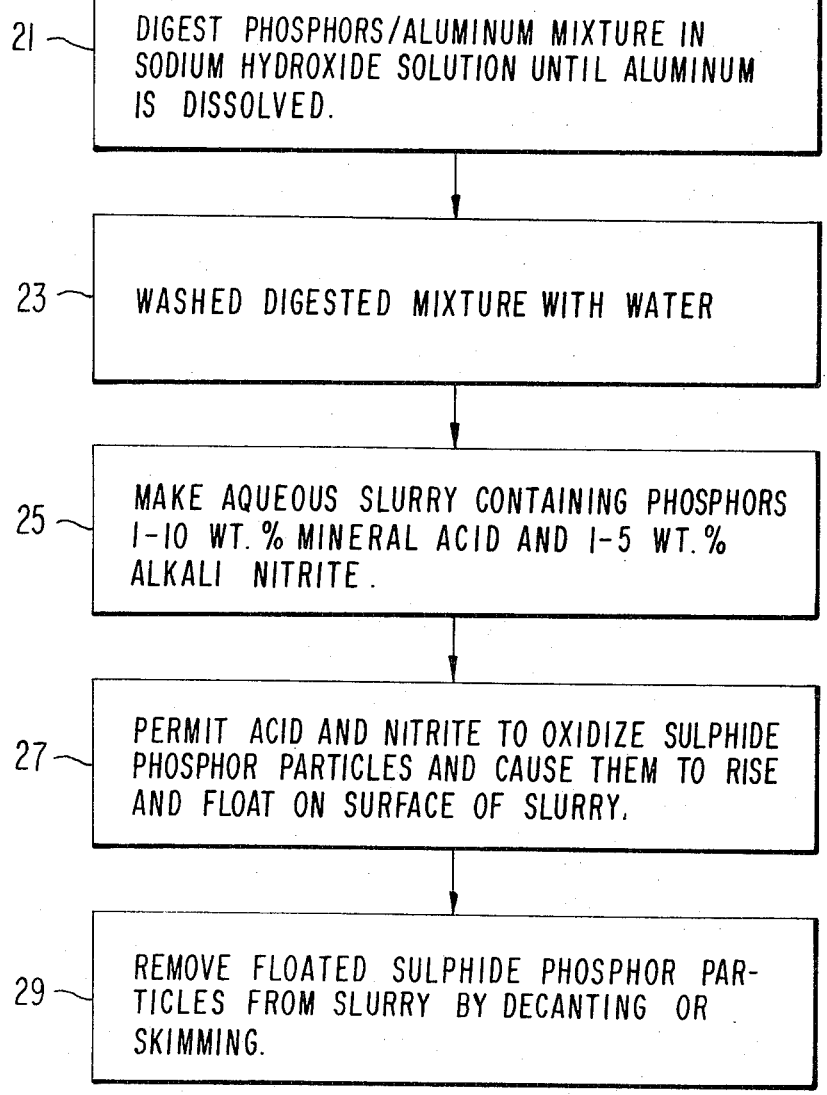

METHOD FOR SEPARATING SULFIDE PHOSPHOR PARTICLES FROM MIXTURES

BACKGROUND OF THE INVENTION

This invention relates to a method for separating chemically-oxidizable metal sulfide phosphor particles from a mixture with essentially nonoxidizable phosphor particles. The invention is applied particularly to recovering red-emitting phosphor particles, which may be for example, europium-activated yttrium vanadate or europium-activated yttrium oxysulfide phosphor particles, that are mixed with blue-emitting zinc sulfide and/or green-emitting zinc-cadmium sulfide phosphor particles.

In U.S. Pat. application Ser. No. 166,011 filed July 26, 1971 by R. B. Platt et al., now Pat. No. 3,740,342 there is described a process for separating chemically-oxidizable metal sulfide phosphor particles from a mixture with essentially nonoxidizable phosphor particles. In that process, an aqueous slurry containing the phosphor mixture and 12 to 22 weight-percent nitric acid is prepared. The nitric acid oxidizes the sulfide particles and causes them to float on the surface of the slurry, and the nonoxidizable phosphor particles settle by gravity. The temperature of the slurry rises to about 70° to 80°C due to the reaction, and there is some danger that the slurry temperature may rise higher unless special precautions are taken.

SUMMARY OF THE INVENTION

The novel method follows the same procedure as the above-cited Platt-et-al. process except that a mixture of 1 to 10 weight-percent mineral acid and 1 to 5 weight-percent alkali nitrite is substituted for the 12 to 22 weight-percent nitric acid. The mineral acid, nitrite, and metal sulfide particles react producing gas bubbles, which cause the sulfide particles to float on the slurry surface, and the nonoxidizable particles settle by gravity. The floating particles are removed by skimming or decantation.

The novel method employs less-concentrated acid, which is cheaper and less hazardous to handle than more-concentrated acid used previously. In addition, the reaction evolves less heat, causing the slurry to rise to lesser temperatures of about 40° to 50°C. The novel method is thereby easier to control as it requires less precaution to carry out.

BRIEF DESCRIPTION OF THE DRAWINGS

FIG. 2 is a flow diagram for a procedure for practicing the novel method with a mixture of phosphors and aluminum.

DETAILED DESCRIPTION OF THE PREFERRED EMBODIMENTS

EXAMPLE 1

Figure 1:
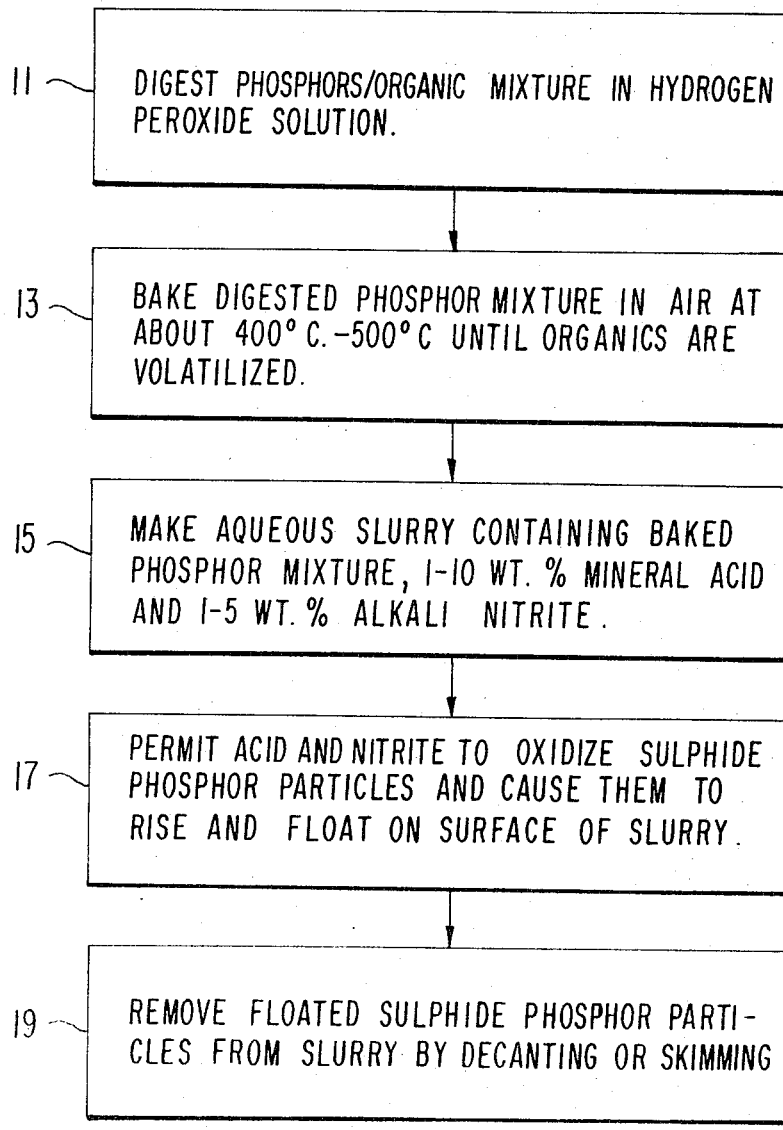
FIG. 1 is a flow diagram for a procecure for practicing the novel method with a mixture of phosphors and organics.

Referring to FIG. 1, about 50 pounds of sludge consisting principally of mixed red-emitting, blue-emitting, and green-emitting phosphors, and organic binders, together with caustic soda and aluminates produced from washing out screen television picture tube panels, are placed in an acid-resistant vessel, equipped with an overhead exhaust system. In this example, the sludge contains red-emitting europium-activated yttrium oxysulfide, green-emitting copper-and-aluminum activated zinc-cadmium sulfide and blue-emitting silver-activated zinc sulfide phosphors. The sludge, which derives from the caustic soda wash tank in the screening room, is alkaline (pH about 11 to 12) and is treated with a hydrogen peroxide solution so that the concentration of peroxide in the slurry is about 3 weight percent.

The digestion proceeds over two or three days during which time the organic materials are oxidized by the peroxide so that the original heavy slimy mass of phosphors and organic material breaks down and the phosphor particles settle in the slurry. This stage is represented by the box 11 in FIG. 1. The peroxide digestion is followed by acidification of the slurry to a pH of about 2 and water washing to remove all the soluble products of the digestion process. The digested sludge, which is now essentially all mixed phosphor particles, is loaded into pyrex glass trays and dried at about 200°C. The dried material is then broken up into lumps and baked at about 450°C in the air for about 6 hours, to ensure that all the residual organic material is volatilized by evaporation or oxidation, as indicated by box 13. The baked, mixed phosphor powder is then loaded into a seven-gallon mill, water is added to provide a slurry containing about 50-percent solids, and the slurry is milled for about 60 minutes. This milling process breaks up small lumps and effectively disperses the particles so that they are readily available to the oxidizing action of the acid and nitrite in the following stage of the novel method. The milled slurry is unloaded from the mill into an acid-resistant vessel, and sufficient water and sulfuric acid are added to make up a slurry containing 10 parts by weight of 5-percent sulfuric acid and 1 part by weight of phosphors. The slurry is stirred. Hydrogen sulfide is evolved. About 1 weight-percent of sodium nitrite (with respect to the weight of the slurry) is stirred in as indicated by the box 15. The oxidation is more rapidly initiated if the slurry temperature at the time of adding the nitrite is between about 50°C and 55°C.

The acid-and-nitrite mixture oxidizes the green-emitting and the blue-emitting sulfide phosphor particles, but not the red-emitting oxysulfide phosphor particles. The oxidation of the sulfide phosphor particles is vigorous, generating nitrogen oxide gases, principally nitrogen dioxide $NO_2$. The sulfide particles rise and float to the surface under the influence of the entrained gases, which appear as bubbles on and in the particles as indicated by the box 17 of FIG. 1. The floating particles are removed from the slurry, leaving the red-emitting oxysulfide phosphor particles settled on the bottom of the vessel as indicated by the box 19. At this time, the supernatant liquid is decanted off, and the settled phosphor is washed several times with water until the pH of the wash water is greater than 5. The washed material is dried at about 200°C for about 4 hours and then baked at about 450°C for about 6 hours and then cooled to room temperature. Examination of recovered red-emitting oxysulfide phosphor shows it to be essentially free of blue-emitting and green-emitting phosphor particles. The recovery is estimated to be about 90 percent of the red-emitting particles initially present in the sludge from the caustic-soda tank.

EXAMPLE 2

Referring now to FIG. 2, about 10 pounds of a mixture consisting mostly of red-emitting yttrium vanadate phosphor particles, blue-emitting zinc sulfide phosphor particles, green-emitting zinc-cadmium sulfide phosphor particles, and aluminum metal particles are added to an acid-resistant vessel equipped with an overhead exhaust system. The mixture derives from luminescent screens removed from television picture tubes and faceplate panels which have been found to be defective in some way subsequent to the aluminizing of the screens. The baking step required for aluminizing removes all of the organic components from the phosphors, leaving only the phosphor particles and the aluminum metal reflective coating. The screen material may be removed from the panels with a vacuum cleaner, which reduces the screen to a dry powder, consisting of particles of the three phosphors and particles of aluminum metal. The aluminum metal is removed from the mixture by adding to the mixture a solution of sodium hydroxide in water to provide a slurry containing about one weight part solids (phosphors and aluminum) and 9 weight parts of 5 weight-percent sodium hydroxide solution.

The aluminum metal reacts readily with the sodium hydroxide to form water-soluble sodium aluminate and liberating hydrogen gas, as indicated in the box 21. The mixed phosphors are in a sufficiently well-dispersed form that the oxidation reaction may proceed at once. By the addition of nitric acid, the residual sodium hydroxide is neutralized. Then, further nitric acid is added to provide about 7 weight-percent nitric acid in the slurry. Sufficient sodium nitrite is then added to provide about 3 weight-percent sodium nitrite in the slurry. The acid-and-nitrite mixture reacts with the blue-emitting and green-emitting sulfide particles as described in Example 1. The oxidation is vigorous, liberating nitrogen oxide gases and resulting in the flotation of the sulfide phosphor particles and leaving the red-emitting vanadate phosphor particles to settle on the bottom of the vessel, as indicated in boxes 25 and 27. The floating raft of sulfide particles is removed by decanting or skimming, and the excess nitric acid is decanted and the settled phosphor particles are washed, dried and baked as in Example 1. Examination of the recovered red-emitting vanadate phosphor shows it to be essentially free of blue-emitting and green-emitting phosphor particles. The recovery is estimated to be about 90 percent of the red-emitting phosphor particles initially present in the phosphors-aluminum mixture.

SOME GENERAL CONSIDERATIONS AND ALTERNATIVES

The novel method makes use of the decomposition of nitrous acid to produce (1) gases that produce flotation of the oxidizable sulfide phosphor particles that are present and (2) elemental sulfur in such form as to cohere the floated phosphor particles into a matt or raft. The overall set of reactions is thought to proceed in the following manner:

A. The solution of 1 to 10 percent mineral acid (e.g., nitric, sulfuric, hydrochloric) reacts with the sulfide phosphor particles to produce hydrogen sulfide, $H_2S$. The reaction should be initiated before adding alkali nitrite to the acid solution containing the slurry. When sulfuric acid is used, the reaction is thought to be:

$$H_2SO_4 + ZnS \rightarrow H_2S + ZnSO_4$$

B. About 1 to 5 weight-percent alkali nitrite, such as sodium nitrite $NaNO_2$, potassium nitrite $KNO_2$, and ammonium nitrite $NH_4NO_2$, is added to the slurry. The nitrite reacts with the acid and hydrogen sulfide present producing free sulfur and nitrogen oxides (designated $NO_x$ below). In general, the reaction (unbalanced) is thought to be:

$$H_2S + 2H^+ + NO_2^- \rightarrow S° + 2H_2O + NO_x$$

When sulfuric acid and sodium nitrite are used, the unbalanced reaction is thought to be:

$$H_2S + 2NaNO_2 + H_2SO_4 \rightarrow S + Na_2SO_4 + 2H_2O + 2NO_x$$

It has to be an essential part of this new process that 1 to 10 percent mineral acid capable of producing hydrogen ions in solution (e.g., nitric, sulfuric, hydrochloric, etc.) is used to produce hydrogen sulfide from zinc sulfide or zinc-cadmium sulfide, because in this process the hydrogen sulfide which is produced reacts to produce sulfur. It has been determined that elemental sulfur is the product responsible for giving cohesiveness to the floated sulfide phosphor particles. Thus it is necessary that mineral acid be added first, followed by the addition of the nitrite. The production of sulfur also dictates that the oxidizable phosphor particles shall be restricted to the sulfide group.

The function of sodium nitrite is to form nitrous acid, which in turn forms nitric oxide and nitric acid. Thus, any nitrite capable of forming nitrous acid in acidic solution can be used. Some nitric oxide is oxidized to nitrogen dioxide. When the reaction reaches this stage, the nitrogen dioxide gas adheres to the surfaces of the sulfide particles, causing them to float to the surface. No explanation has been developed to explain why the gas bubbles adhere selectively to the sulfide particles and cause them to float. The above reactions continue until the sulfide phosphors are removed or the nitrous acid is depleted.

Zinc sulfide phosphors and zinc-cadmium sulfide phosphors activated with silver or copper are examples of sulfide phosphors which may be used with the novel method. Yttrium vanadate and yttrium oxysulfide each activated with europium or other rare-earth ions are examples of phosphors which are essentially resistant to oxidation by the acid-and-nitrite mixture, and which may be separated from sulfide phosphors by the novel method.

I claim:

1. A method for separating oxidizable metal sulfide phosphor particles from a mixture with relatively non-oxidizable phosphor particles comprising
   a. producing an aqueous slurry containing said mixture of phosphor particles
   b. adding sufficient mineral acid to said slurry to provide a concentration of about 1 to 10 weight percent mineral acid in said slurry,
   c. adding sufficient alkali nitrite to said slurry to provide a concentration of 1 to 5 weight-percent alkali nitrite in said slurry, said nitrite being capable of forming nitrous acid in said slurry,
   d. permitting said acid and nitrite to react with said oxidizable phosphor particles whereby said oxidizable phosphor particles rise and float on the surface of said slurry,
   e. and then removing said floated phosphor particles from said slurry.

2. The method defined in claim 1 wherein said alkali nitrite is at least one of sodium nitrite, potassium nitrite, and ammonium nitrite.

3. A method for separating zinc sulfide and zinc-cadmium sulfide phosphor particles from a mixture thereof with relatively nonoxidizable phosphor particles comprising
   a. producing a slurry of said mixture in an aqueous medium,
   b. adding sufficient mineral acid to said slurry to provide a concentration of about 1 to 10 weight-percent mineral acid in said slurry,
   c. adding sufficient alkali nitrite to said slurry to provide a concentration of 1 to 5 weight-percent alkali nitrite in said slurry, said nitrite being capable of forming nitrous acid in said slurry,
   d. permitting said acid and nitrite to react with said sulfide phosphor particles whereby said sulfide phosphor particles float on the surface of said slurry and said nonoxidizable phosphor particles remain submerged in said slurry,
   e. and then removing said floated sulfide phosphor particles from said slurry while retaining said submerged nonoxidizable phosphor particles in said slurry.

4. The method defined in claim 3 wherein said mixture comprises also organic matter, and including, prior to step (a), the steps of digesting said mixture in a dilute aqueous solution of an oxidant, washing said digested mixture with water, and then baking said washed mixture in air at about 400° to 500°C until substantially all of the organic matter present in the mixture is removed.

5. The method defined in claim 3 wherein said mixture comprises also particles of aluminum metal, and including the step, prior to step (a), of digesting said mixture in a dilute aqueous solution of an alkali hydroxide until said particles of aluminum metal are dissolved.

6. The method defined in claim 3 wherein said nonoxidizable phosphor particles consist essentially of yttrium oxysulfide phosphor particles.

7. The method defined in claim 3 wherein said nonoxidizable phosphor particles consist essentially of yttrium vanadate phosphor particles.

* * * * *

UNITED STATES PATENT OFFICE
CERTIFICATE OF CORRECTION

Patent No. 3,846,328         Dated November 5, 1974

Inventor(s) Bernard Beverly McCue

It is certified that error appears in the above-identified patent and that said Letters Patent are hereby corrected as shown below:

Title     Change "Method for Separating Sulfide Phosphor Particles from Mixtures" to --Method for Separating Sulfide Phosphor Particles from Mixtures with Essentially Nonoxidizable Phosphor Particles--

Signed and sealed this 7th day of January 1975.

(SEAL)
Attest:

McCOY M. GIBSON JR.         C. MARSHALL DANN
Attesting Officer             Commissioner of Patents